United States Patent Office 3,822,126

Patented July 2, 1974

3,822,126

PROCESS FOR FORMING IMAGES

Eiichi Inoue, Tokyo, Takao Nakayama, Yokohama, and Yutaka Oka and Yasuo Nakai, Tokyo, Japan; said Nakayama, Oka and Nakai assignors to Fuji Photo Film Co., Ltd., Kanagawa-ken, and Dai Nippon Printing Co., Ltd., Tokyo, Japan, fractional part interest to each Filed June 14, 1972, Ser. No. 262,523

Claims priority, application Japan, June 18, 1971, 46/43,275

Int. Cl. G03c 5/04, 5/24, 1/72

U.S. Cl. 96—27 R 16 Claims

ABSTRACT OF THE DISCLOSURE

An image of an organic coloring agent is formed by exposing a layer of an organic coloring agent on a base to light, contacting an image-receptive material with said layer and heating them to transfer the unexposed portions or the exposed portions of said layer onto the image-receptive material.

This invention relates to a process for forming images and more particularly relates to a process for forming images which comprises imagewise exposing a layer of an organic coloring agent on a base to light, contacting an image-receptive material with said layer and heating them to transfer the exposed portions or unexposed portions of said layer onto the image-receptive material.

There have already been developed and proposed various methods for forming images utilizing a color forming reaction by light. For example, there are known a free radical photography and a method wherein Dylux (Trade name, made by Dupont de Nemours & Co.) is used as a color developing material disclosed recently. These methods will be described more particularly.

The former is a method for forming image by producing one of triphenylmethanes by the reaction of the free radical produced by the photodecomposition of a halogen compound and a secondary or tertiary amine as in the case of forming blue image at about 0.01 in ASA unit, when a nitrocellulose film containing, for example diphenylamine and carbon tetrabromide is exposed to light.

The latter is a method for forming desired images by exposing imagewise a layer containing a mixture of an organic coloring agent such as a leuco form of a triphenylmethanic dye, a photooxiding agent, and a photoredox system which does not reduce the photooxidizing agent by itself but forms a reducing agent by the action of light of other wave length than that of the light used for the image exposure and the reducing agent reduces the photooxidizing agent, and thereafter fixing the image by exposing to light capable of forming the above-mentioned reducing agent from the photooxidizing agent.

However, in those methods as mentioned above, there is a defect that such second and third components as the halogen compound or oxidizer must be used in addition to the color forming component since, for example, in the former case, the coloring agent is formed by the free-radical produced by the photodecomposition of the halogen compound and, in the latter case, the coloring agent is formed from the leuco form by the oxidizer and there are further defects that therefore the color forming reaction is carried out in a complicated mechanism as well as the formation of the image is also complicated and thus it is quit difficult to control the formation of images.

Further since, in the former method described above, a volatile substance as carbon tetrabromide is used for the substance producing a free-radical there are defects that the storage stability after the production of a photosensitive material is comparatively short and that nontoxicity to human bodies is not well guaranteed.

Further, as the second and third components are used in addition to the color forming components, there are defects that it is very difficult to form a uniform film layer of the color forming component on the base and that therefore it is very difficult to elevate the resolving power of the color developing image.

Therefore, an object of the present invention is to form an image by utilizing a coloring agent alone.

Another object of the present invention is to form an image having very high stability.

A further object of the present invention is to form any clear image having high resolving power.

Still other object of the present invention is to simply form an image by a simple manner.

As the results of various investigations of over-coming the aforesaid difficulties and forming desired image by utilizing a photochemical reaction, the inventors have discovered that a layer of an organic coloring agent formed on a base by means of vacuum-evaporating or coating method is exposed through a pattern or image to light and said layer is contacted with an image-receptive material and then they are heated whereby the unexposed or exposed portions of said layer onto the image-receptive material.

According to the present invention, therefore, there are provided a process for forming images which comprises imagewise exposing a layer of an organic coloring agent on a base to light, contacting an image-receptive material with said layer and heating them to transfer the unexposed portions of said layer onto the image-receptive material, and also a process for forming images which comprises imagewise exposing a layer of an organic coloring agent on a base to light, contacting an image-receptive material with said layer and heating them to transfer the exposed portions of said layer onto the image-receptive material.

The method of the above mentioned present invention shall be explained more particularly in the following.

First of all, in the present invention, a layer of an organic coloring agent alone can be provided on a base by various methods. For example, a layer of the organic coloring agent alone can be formed on a base by a method wherein, for example, the organic coloring agent alone is deposited by an ordinary vacuum-evaporating method or the base is coated by an ordinary coating method such as, for example, a brush-coating, spatula-coating, casting or roll-coating with a solution prepared by dissolving the organic coloring agent alone in a solvent which dissolved said coloring agent and then the solvent is removed.

In the present invention, any base known to those skilled in the art can be used. There are, for example, a glass plate, any metal plate or foil, any paper or processed paper, wood and any high molecular weight compound film or sheet which may be transparent, translucent or opaque.

By the way, in the present invention, in the case of providing a layer of an organic coloring agent alone on a base by an ordinary vacuum-evaporating or coating method, it is desirable to treat in advance the surface of a base by such known process as washing and degreasing it, for example, with an alkali, organic solvent or chromic acid mixture.

Further, in the present invention, there can be used such organic coloring agent having such property that, when it is exposed with a light, the color will be developed, discolored or faded and that said exposed part and unexposed part are different from each other in the solubility with the solvent as, for example, diphenylmethanic basic dye as Auramine, such triphenylmethanic basic dye as Malachite Green, Brilliant Green, Crystal Violet, Rose Aniline, Victoria Blue and Methyl Violet, such xanthenic basic dye as Rhodamine Erythrosine, Pyronin G and Eosine B, such thiazinic basic dye as Methylene Blue or Quenothiazine, such acridinic basic dye as Acridine Orange and such coloring agent as lipofurabin.

The coloring agent to be used in the present invention is not in such state as of a leuco form but is itself in a color developing state. When vacuum-evaporation deposited, the color of the triphenylmethanic basic dye or thiazinic basic dye will become so faint that, when it is exposed with a light absorbed by the coloring agent, the color density become much higher to be likely to form a so-called color developing type image. Even when any of the other coloring agents are vacuum evaporation-deposited, it will retain a color inherent to the coloring agent and, when it is exposed with a light absorbed by the coloring agent, it will be likely to be discolored or faded or to form a so-called discolored or faded type image.

Further, in the vacuum-evaporation generally the higher the vacuum degree, the higher the physical strength of the vacuum-evaporation-deposited film. However, it is usually desirable to make the vacuum degree lower than $10^{-4}$ torr. It is also desirable to make the evaporating source temperature a little higher than the melting point of the substance to be vacuum-evaporation-deposited, that is, the organic coloring agent.

Further, in the vacuum-evaporating method used in the present invention, in order to make a more compact vacuum-evaporation-deposited thing, it is desirable to make the vacuum-evaporation-depositing velocity rather low.

In the coating method of the present invention, for the solvent to dissolve the organic coloring agent, there can be used any one or mixture of two or more of such known solvents as, for example, hydrocarbons such as hexane, cyclohexane, benzene, toluene or xylene, halogeno-hydrocarbon solvent such as chloroform, carbon tetrachloride, trichloroethylene, monochlorobenzene, O-dichlorobenzene and trichlorobenzene, alcohols, phenols and ethers such as methanol, ethanol, propyl alcohol, butyl alcohol, phenol, dioxane, tetrahydrofuran, ethyleneglycol and propyleneglycol, acid or its esters such as acetic acid, methyl acetate, ethyl acetate and butyl acetate, ketones such as acetone, methyl ethyl ketone and methyl isobutyl ketone and other solvent such as nitrobenzene, dimethyl formamide, dimethyl sulfoxide and water.

In the present invention, the concentration of the organic coloring agent dissolved in the solvent described above is not specifically limited, for example, because the supernatant liquid of the solution prepared by dissolving it can be also used. However, preferable concentration is from about 1.0 to about 0.01 g./l.

Further, in the above mentioned present invention, the thickness of the film layer of the organic coloring agent alone is not limited but is preferably from about 0.1 to about 10 microns.

Now, in the present invention, when a layer of an organic coloring agent alone is provided on a base and is then exposed with a light absorbed by the coloring agent in the film layer such as a light by such ordinary method as a contact light-exposing method or a projection light-exposing method through an optical system through a pattern, the color in the film layer in the exposed part will be developed, discolored or faded to form any visible image.

In the above description, the exposing light source may be either an ultraviolet light or visible light. Further, there can be used infrared rays and, for example, a mercury lamp, Xenon lamp, tungsten lamp or infrared lamp.

Then, in the present invention, after the light which can be absorbed by the coloring agent is exposed onto the layer of the coloring agent the exposed surface is contacted with an image-receptive material and they are heat-treated with for example a method for carrying out a heat-transferring by the short contact of them with an iron or a hot-press which is heated at a suitable temperature or a method for passing them between hot rolls which are heated at a suitable temperature, and thereafter the layer on either of the exposed part and unexposed part can be transferred onto the image-receptive material to form permanent visible images of a very high resolving power by said organic coloring agent alone developed, discolored or faded on the base and image-receptive material.

In the heating treatment, the heating temperature is different depending on the kind of the organic coloring agent, base or image-receptive material used but is preferably about 130 to 300° C.

The mechanism that, when heated, the layer on either of the exposed part and unexposed part will be selectively transferred in the present invention is not yet clear but it is presumed that when the layer of the organic coloring agent alone is exposed with a light in said exposed part and unexposed part, the melting or subliming temperature of the coloring agent in the layer will vary and a difference will be produced.

Now, in the heating treatment, for the image-receptive material, there can be used any of known things such as, for example, a paper or processed paper, a glass plate, a metal plate or foil, wood, cloth and a high molecular weight compound film or sheet.

Further, in the present invention, after an image is formed on the base by applying a heating treatment, said image forming surface is again contacted with the image-receptive material and then it can be heated at a heating temperature a little higher than in the above so that the image formed on the base may be transferred onto the image-receptive material to form a permanent visible image of the organic coloring agent alone.

Also, in the present invention, after an image is formed on the base by applying a heating treatment, said image forming surface is again contacted with the image-receptive base material and it can be treated with a solvent on the one side of said image-receptive material so that the image formed on the base may be formed on the image-receptive material.

For the solvent to be used in the above, there can be selected from the solvents used in the case of dissolving the organic coloring agent.

As evident from the above explanation, in the method of the present invention, a layer of an organic coloring agent alone provided by a vacuum-evaporating method or a coating method is imagewise exposed to a light and is then heated so that the layer on either of the exposed part and unexposed part may be transferred to form permanent visible images of the organic coloring agent alone on the base and image-receptive material.

In the present invention, as a layer of an organic coloring agent alone is formed by a vacuum-evaporating method or a coating method, the layer provided on the base is a uniform film of the coloring agent and, as an image is formed by utilizing such uniform film of the coloring agent, the image obtained in the above is very high in the resolving power and is uniform and stable.

Further, in the present invention, as an image is formed by transferring either layer by utilizing the difference in the melting or subliming temperature in heating the film layer between the exposed part and unexposed part, the base or image-receptive material will be exposed to a light, therefore the contrast between the image part and non-image part will increase and the image property will be remarkably improved.

Further, in the present invention, as the layer in either of the exposed part and unexposed part is transferred onto the image receptive material to form images simultaneously on the base and image-receptive material, there is an advantage that a negative image and positive image can be simultaneously formed.

Now, in the present invention, as a film layer of an organic coloring agent alone is only provided on the base, the formation is simplified, such second and third components as, for example, a binder, substance producing a free group and oxidizer are not used at all, therefore no unstable element by them is recognized and there is an advantage that the handling is very simple.

Further, as the image formed on the base can be transferred onto the image-receptive material by being heated at a higher temperature to form an image, the negative image and positive image can be moved to an entirely separate base from the photosensitive base.

The method of the present invention is a novel image forming method not seen in any conventional method and has an extensive application field.

There are uses such as, for example, for various mask materials, precise patterns or displays for letters, screens and other complicated designs and particularly an image formed on such transparent base as a glass plate is very important as a color mask for I.C. (integrated circuits).

Examples are given in the following to more concretely explain the method of the present invention.

Example 1

A uniform photosensitive material of a film thickness of 0.13 micron was made by vacuum-evaporation depositing Rhodamine on a glass plate of a thickness of about 0.5 mm. well degreased and washed by being dipped in a chromic acid mixture while gradually elevating the evaporating source voltage to 2 volts at a vacuum degree of $10^{-4}$ torr. Then this photosensitive material with a pattern brought into close contact with it with a vacuum printing frame was exposed to a light for about 3 minutes at a distance of about 10 cm. by using a superhigh voltage mercury lamp of 250 watts as a light source. The exposed part discolored to a reddish orange color from a bluish purple color at the time of the evaporation. When a high quality paper (of 52.5 g./m.$^2$) was then brought into close contact with the color image surface of this photosensitive material and the photosensitive material was heated and pressed for about 20 seconds on the back surface with an iron heated to about 165° C., the bluish purple part of the non-exposed part was moved perfectly to the high quality paper to obtain a clear reddish orange positive image on the photosensitive material and a bluish purple negative image on the high quality paper. In the above, even when Acridin Orange was used instead of Rhodamine and the operation was made the same as in the above, the same result as is mentioned above was obtained.

Example 2

A uniform photosensitive material of Crystal Violet of a film thickness of 0.13 micron was made by a vacuum-evaporating operation on the same base plate as in Example 1 by the same method as in Example 1. When this photosensitive material was then exposed to a light through a pattern in the same manner as in Example 1, the exposed part developed a thicker blue color from a blue color at the time of the evaporation. When a high quality paper (of 52.5 g./m.$^2$) was then brought into close contact with the color image surface of this photosensitive material and the photosensitive material was heated and pressed for about 20 seconds on the back surface with an iron heated to about 180° C., the non-exposed part was moved perfectly to the high quality paper to obtain a clear blue positive image on the photosensitive material and a blue negative image on the high quality paper. Even when the same operation as is mentioned above was made by using Methylene Blue instead of Crystal Violet, the same result was obtained.

Example 3

A photosensitive material was made by applying a methyl alcohol solution of 1% Pyronin G onto an aluminum plate well degreased and washed by being dipped for about 10 minutes in a sodium hydroxide solution and naturally drying it. When this photosensitive material was image-exposed to a light through a pattern in the same manner as in Example 1, the exposed part discolored to a reddish orange color from a reddish purple color at the time of the evaporation. When a high quality paper (of 52.5 g./m.$^2$) was then brought into close contact with the color image surface of this photosensitive material and the photosensitive material was heated and pressed for about 20 seconds on the back surface with an iron heated to about 170° C., the nonexposed part was moved perfectly to the high quality paper to obtain a reddish orange positive image on the photosensitive material and a reddish purple negative image on the high quality paper.

Example 4

A uniform photosensitive material of Auramine of a film thickness of 0.15 micron was made by a vacuum-evaporating operation on the same base plate as in Example 1 by the same method as Example 1. When this photosensitive material was exposed to a light through a pattern in the same manner as in Example 1, the exposed part was decolored to be colorless from a yellow color at the time of the evaporation. When a high quality paper (of 52.5 g./m.$^2$) was then brought into close contact with the color image surface of the photosensitive material and was heated and pressed between hot stamps heated to about 270° C., the non-exposed part was moved perfectly to the high quality paper to obtain a yellow negative image on the high quality paper and a thin yellow positive image on the photosensitive material.

Example 5

A uniform photosensitive material of Rhodamine of film thickness of 0.13 micron was made by the same vacuum-evaporating operation as in Example 1 on an aluminum plate well degreased and washed by being dipped for about 10 minutes in a sodium hydroxide solution. When this photosensitive material was image-exposed to a light through a pattern in the same manner as in Example 1, the exposed part disclored to a reddish orange color from a bluish purple color at the time of the evaporation. When a high quality paper (of 52.5 g./m.$^2$) was then brought into close contact with the color image surface of this photosensitive material and the photosensitive material was heated and pressed for 20 seconds on the back surface with an iron heated to about 165° C., the bluish purple part of the non-exposed part was moved perfectly to the high quality paper to obtain a clear reddish orange positive image on the photosensitive material and a reddish purple negative image on the high quality paper. When a high quality paper (of 52.5 g./m.$^2$) was then brought into close contact with the color image surface of this photosensitive material and the photosensitive material was heated and pressed for about 20 seconds on the back surface, the reddish orange positive image remaining on the photosensitive material was moved perfectly to the high quality paper. When the transferring treatment was applied by thus varying the temperature twice, both negative and positive images were obtained on the base to which a transfer could be made.

Example 6

The same pattern-exposure to a light and heating transferring treatment as in Example 2 were applied to the photosensitive material of Crystal Violet made in the Example 2 to form images on the photosensitive material and high quality paper. When another high quality paper was brought into close contact with this photosensitive material and the photosensitive material was heated and pressed for about 20 seconds on the back surface with an iron heated to above 200° C., the blue image remaining on the photosensitive material was moved perfectly to the high quality paper to obtain both negative image and positive image on the high quality paper.

Example 7

The photosensitive material of Crystal Violet made in Example 2 was image-exposed and heated in the same manner as in Example 1 to form a blue image. When another high quality paper (of 52.5 g./m.$^2$) was brought into close contact with the color image surface of this photosensitive material and was rubbed uniformly on the back surface with an absorbent cotton impregnated with ethyl alcohol, the blue image of Crystal Violet dissolved out into the ethyl alcohol and moved at the same time perfectly to the high quality paper to form a blue image on the high quality paper. Nothing remained on the photosensitive base.

Example 8

The photosensitive material of Rhodamine made in Example 1 was image-exposed and heated in the same manner as in Example 2 to form a reddish orange image. When another high quality paper (of 52.5 g./m.$^2$) was then brought into close contact with the color image surface of this photosensitive material and was rubbed uniformly on the back surface with an absorbent cotton impregnated with ethyl alcohol, the reddish orange image of Rhodamine dissolved out into the ethyl alcohol and moved at the same time perfectly to the high quality paper to form a reddish orange image on the high quality paper.

What we claim is:

1. A process for forming images which comprises: imagewise exposing a layer of an organic coloring agent on a base to light, said coloring agent being selected from the group consisting of diphenylmethanic, triphenylmethanic, xanthenic, thiazinic and acridinic dyes, contacting an image-receptive material with said layer and heating them to transfer the unexposed portions of said layer onto the image-receptive material.

2. A process as claimed in Claim 1 wherein the thickness of said layer of organic coloring agent is 0.1 to 10$\mu$.

3. A process as claim in Claim 1 wherein the layer of the organic coloring agent is formed by a conventional method such as vacuum evaporating and coating methods.

4. A process as claimed in Claim 1 wherein the image-receptive material is selected from paper, cellulose film, glass plate, metal sheet, resin film and resin sheet.

5. A process for forming images which comprises: imagewise exposing a layer of an organic coloring agent on a base to light, said coloring agent being selected from the group consisting of diphenylmethanic, triphenylmethanic, xanthenic, thiazinic and acridinic, contacting an image-receptive material with said layer and heating them to transfer the exposed portions of said layer onto the image-receptive material.

6. A process as claimed in Claim 5 wherein the thickness of said layer of organic coloring agent is 0.1 to 10$\mu$.

7. A process as claimed in Claim 5 wherein the layer of the organic coloring agent is formed by a conventional method such as vacuum evaporating and coating methods.

8. A process as claimed in Claim 5 wherein said dyes are basic.

9. A process as claimed in Claim 5 wherein said organic coloring agent is selected from Auramine, Malachite Green, Brilliant Green, Crystal Violet, Rose Aniline, Victoria Blue, Methyl Violet, Rhodamine, Erythrosine, Pyronin G, Eosin B, Methylene Blue, Quenothiazine, Acridine Orange and lipofurabin.

10. A process as claimed in Claim 5 wherein the image-receptive material is selected from paper, cellulose film, glass plate, metal sheet, resin film and resin sheet.

11. A process for forming images which comprises: imagewise exposing a layer of an organic coloring agent on a base to light to form exposed and unexposed portions of said layer, said coloring agent being selected from the group consisting of diphenylmethanic, triphenylmethanic, xanthenic, thiazinic and acridinic dyes, said organic coloring agent upon exposure to light producing a difference in solubility between said exposed and unexposed portions, contacting an image-receptive material and heating them to transfer one of such portions of said layer onto the image-receptive material.

12. The process of Claim 11 wherein the dyes are basic.

13. The process of Claim 11 wherein the dyes are selected from Auramine, Malachite Green, Brilliant Green, Crystal Violet, Rose Aniline, Victoria Blue, Methyl Violet, Rhodamine, Erythrosine, Pyronin G, Eosin B, Methylene Blue, Quenothiazine, Acridine Orange and lipofurabin.

14. A process as claimed in Claim 11 wherein the organic coloring agent is diphenylmethanic, triphenylmethanic, xanthenic, thiazinic and acridinic dyes.

15. A process as claimed in Claim 14 wherein said dyes are basic.

16. A process as claimed in Claim 14 wherein said organic coloring agent is selected from Auramine, Malachite Green, Brilliant Green, Crystal Violet, Rose Aniline, Victoria Blue, Methyl Violet, Rhodamine, Erythrosine, Pyronin G, Eosin B, Methylene Blue, Quenothiazine, Acridine Orange and lipofurabin.

References Cited

UNITED STATES PATENTS

| | | | |
|---|---|---|---|
| 3,487,764 | 1/1970 | Borden et al. | 96—48 R |
| 3,690,889 | 9/1972 | Harrison et al. | 96—89 |

RONALD H. SMITH, Primary Examiner

R. L. SCHILLING, Assistant Examiner

U.S. Cl. X.R.

96—48 R, 48 HP, 89